United States Patent [19]

Williams

[11] 3,906,653

[45] Sept. 23, 1975

[54] FISHING ROD SUPPORT
[75] Inventor: Clyde M. Williams, Atoka, Okla.
[73] Assignee: Reid K. Mayfield, Atoka, Okla. ; a part interest
[22] Filed: Jan. 30, 1974
[21] Appl. No.: 437,889

[52] U.S. Cl. ................................. 43/21.2
[51] Int. Cl.² ......................................... A01K 97/10
[58] Field of Search ...................................... 43/21.2

[56] References Cited
UNITED STATES PATENTS

| | | | |
|---|---|---|---|
| 2,204,692 | 6/1940 | Parisio | 43/21.2 |
| 2,564,625 | 8/1951 | Jackson et al. | 43/21.2 |
| 2,630,993 | 3/1953 | Cagnoli | 43/21.2 |
| 3,290,816 | 12/1966 | Eklof | 43/21.2 |

Primary Examiner—Warner H. Camp
Attorney, Agent, or Firm—Richards, Harris & Medlock

[57] ABSTRACT

An improved support for a fishing rod having a rigid body and a base for anchoring the body in place. In one embodiment, the base is a hollow ground rod for insertion into the earth. In another embodiment, the base is a clamp arrangement for clamping to a boat, pier or the like. The rod and reel are attached to the body, while the body allows rotation of the rod and reel about both vertical and horizontal axes. Rotation about the horizontal axis is controlled by the resilient interengagement of pawls with a plurality of ratchet teeth.

8 Claims, 7 Drawing Figures

FISHING ROD SUPPORT

BACKGROUND OF THE INVENTION

The present invention relates generally to improvements in fishing rod supports. In another aspect, this invention relates to a new and improved support for holding a fishing rod in an elevated position and allowing controlled rotation of the rod about a horizontal axis upon the application of a minimum force on the fishing line. According to a third aspect of the present invention, a fishing rod support is provided having a uniquely-shaped anchor for resisting rotation of the anchor in the ground.

Various devices have been used by anglers in the sport of fishing. One commonly used device is a support for a rod and reel for fishing when the rod is left unattended. These supports enable the angler to simultaneously fish with a plurality of rods without the burden of constantly supporting each rod and reel in a suitable attitude. Many supports have been used for this purpose such as those shown in U.S. Pat. Nos. 1,665,914; 2,184,583; 2,665,866; 2,899,769; 3,259,346; 3,411,231; and 3,516,190.

In the use of these supports it has been found that once a fish has become hooked on the line, the fish will attempt to disengage the hook and will swim about applying forces on the support in various magnitudes and from various directions. In many instances, it has been found that in these circumstances, portions of the fishing line will be subjected to stress concentration causing unnecessary failure of the fishing line. It is believed that one area of stress concentration on the fishing line is located at the point the line contacts the fishing rod. It is also believed that this problem is further magnified by the presence of extreme bends in the line at the point of contact with the rod.

It thus becomes apparent that for a rod support to adequately satisfy its desired function, it must not only support the rod and reel in a desirable attitude but also be effective to reduce stress concentration in the fishing line, created by a fish.

SUMMARY OF THE INVENTION

Therefore, according to one embodiment of the invention, an improved rod holder is provided having a clamping member which engages the rod and allows controlled rotation of the rod about a horizontal axis. This controlled rotation of the rod accomplishes two functions. First, when a fish becomes hooked on the line, the force exerted by the fish on the line will cause downward rotation of the rod indicating the presence of a fish to the fisherman. Second, the downward rotation allows the rod to assume a position which reduces extreme bends in the fishing line at the point of contact with the rod to thus reduce stress concentrations in the line. A resiliently engaging ratchet-pawl assembly is provided on the holder to allow rotation of the rod upon the application of a force on the line in excess of a set minimum. In addition, the holder allows rotation of the rod about a vertical axis to allow the rod to move to a horizontal position which reduces stress concentration in the line.

According to another embodiment of the present invention, the improved fishing rod support of the present invention provides the use of a hollow ground rod for insertion into the ground to anchor the support in place to thereby prevent rotation and disengagement of the rod from the ground.

According to another embodiment of the present invention, a clamping means is provided for the improved fishing rod support of the present invention for attachment to the side of a boat, dock, bridge or the like.

The advantages of the present invention will be readily appreciated by those of ordinary skill in the art as the same becomes better understood by reference to the following detailed description when considered in connection with the accompanying drawings in which:

DESCRIPTION OF THE PREFERRED EMBODIMENTS

Figure 1:
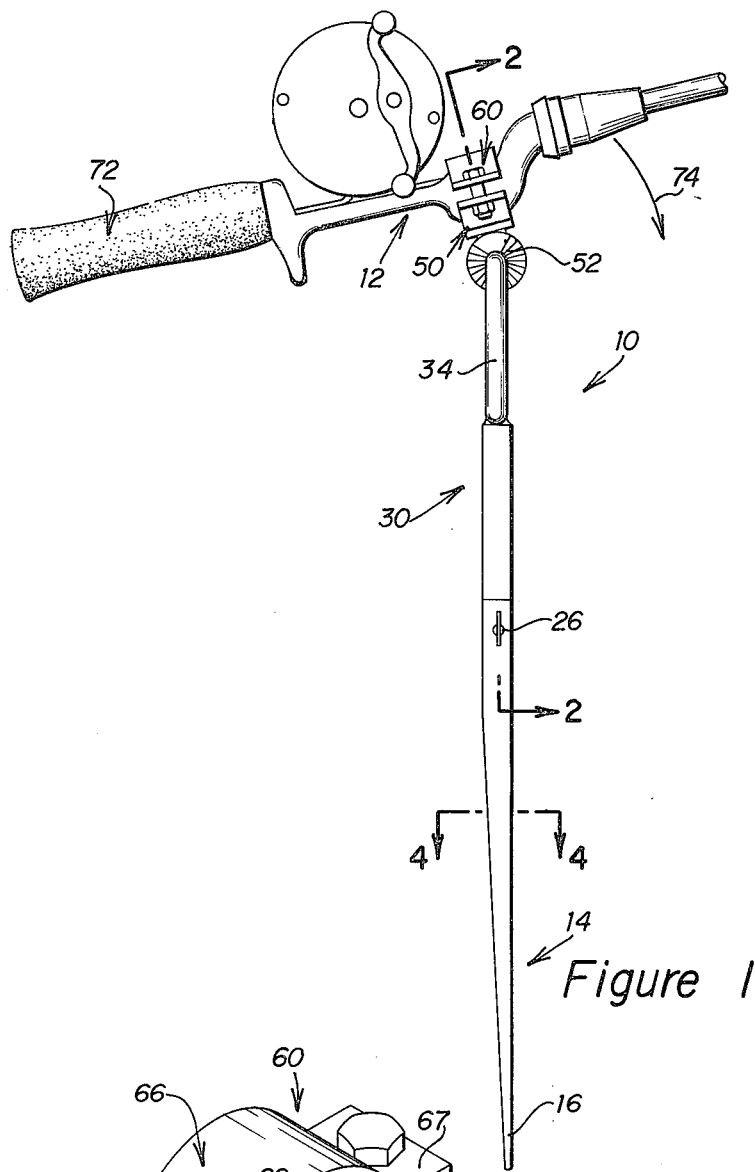
FIG. 1 is a side elevation view of the improved fishing rod support of the present invention attached to the handle of the fishing rod and reel assembly.
Figure 2:
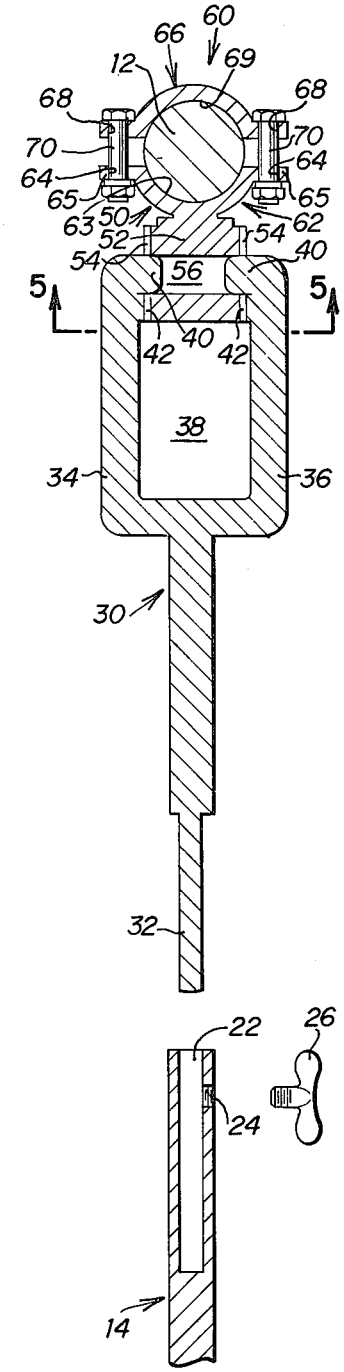
FIG. 2 illustrates a vertical section of the device taken on lines 2—2 of FIG. 1, looking in the direction of the arrows.
Figure 3:
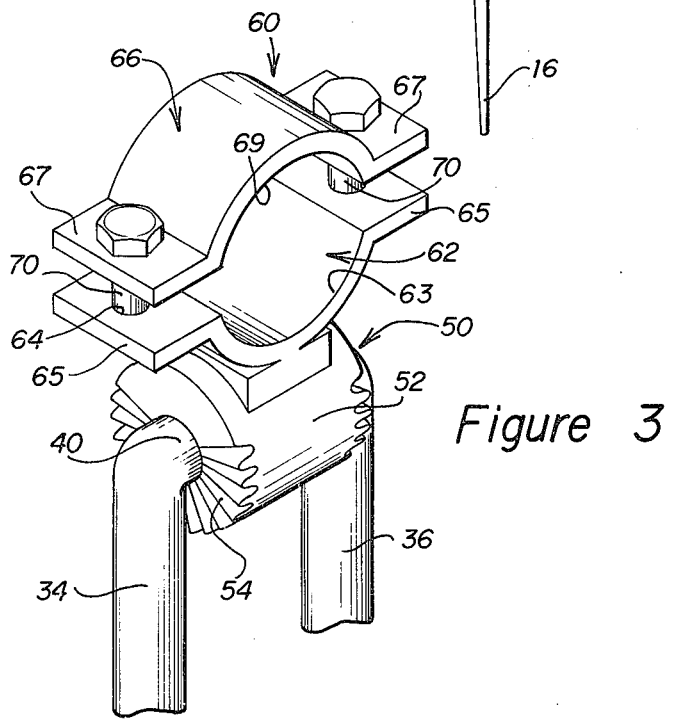
FIG. 3 is an enlarged perspective view of the clamping member and its attachment to the body of the improved fishing rod support assembly of the present invention.

Referring now to the drawings, wherein like reference characters designate like or corresponding parts throughout the several views, there is illustrated in FIGS. 1–5 an embodiment of the fishing pole support assembly 10. This fishing pole support assembly 10 is of the type utilized by fishermen to anchor a fishing rod and reel 12 in place by embedding a portion of the support assembly 10 in the ground. The assembly 10 is provided with means permitting selection of the position or attitude in which the rod will be held while supported by the assembly 10. In addition, once the rod and reel 12 are attached to the assembly 10 and the lure or bait is placed in the water, the assembly can be left unattended with periodic attention to determine if a fish has been hooked on the line of the rod and reel assembly.

Figure 4:
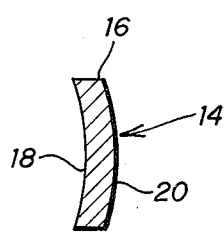
FIG. 4 illustrates a section of the device taken on lines 4—4 of FIG. 1, looking in the direction of the arrows.

The support assembly 10 has a base 14 of rigid material for insertion into the ground to anchor the assembly 10. The base 14 has a tapered end 16. This portion 16 allows easy insertion of base 14 into the ground. The portion 16 is hollow ground as illustrated in FIG. 4, to provide a concave surface 18 and convex portion 20 to prevent the base 14 from rotating in or disengaging from the ground.

The upper end of the base 14 is provided with an elongated cylindrical socket 22 extending along the length of the base 14. A threaded bore 24 intersects the socket 22 transverse thereto. A correspondingly threaded wing nut 26 is threaded into the bore 24.

An elongated body 30 is provided for connection to the base 14. A reduced diameter portion 32 is provided on one end of the body 30 for insertion into the socket 22. Portion 32 is selected of a size to easily fit into the socket and to allow rotation of the body 30 with respect to the base 14 about a vertically extending axis. The wing nut 26 can be threaded into the bore 24 and tightened to frictionally engage the portion 32 to allow locking of the body 30 with respect to the base 14. By loosening the wing nut 26, the body 30 can freely rotate with respect to the base 14 or be easily removed by lifting in a vertically upward direction.

On the end of the body 30 opposite the portion 32, is a forked portion which has parallel extending arms 34 and 36. These arms 34 and 36 define a space 38 therebetween. The cylindrical ends 40 of the arms 34 and 36 are turned in an inward facing direction and are coaxially aligned with each other. In addition, pawls 42 are formed on the inside of the arms 34 and 36.

A clamp assembly 50 is attached to the upper end of the body member 30. The clamp assembly 50 has a cylindrical member 52 with a plurality of ratchet teeth 54 formed on the ends thereof. A central bore 56 is provided through the cylindrical member 52 and selected of a size to receive the ends 40 therein. The length of the cylindrical member 52 and a spacing between the ends 40 allows the clamp assembly 50 to be attached to the body 30 while allowing rotation of the clamp assembly 50 about a horizontally extending axis. The ratchet teeth 54 are positioned such that the pawls 42 will engage the teeth to prevent unrestricted rotation of the clamp assembly 50 with respect to body 30. The arms 34 and 36 are designed with sufficient resiliency to urge the arms in the direction to cause engagement of pawls 42 and teeth 54. By forcing rotation of the clamp assembly 50, the arms 34 and 36 will be deflected in an outward direction to allow movement of the clamp assembly 50 with respect to the body 30. In addition, the arms 34 and 36 can be deflected by hand in an outward direction to allow free rotation of the clamp assembly to a desired position.

Supported on the cylindrical member 52 is a clamp member 60. This clamp member 60 is used to attach rod and reel 12 to the assembly 50. The clamp member 60 has a lower section 62 attached to the cylindrical member 52. The lower section 62 defines a socket 63 with flanges 65 on either side. The flanges 65 are provided with bores 64 adjacent their ends. A second mating section 66 is similar in construction to section 62 and is provided with flanges 67 having bores 68 therein. A socket 69 is formed in section 66 and defines with socket 63 a means for gripping the rod and reel 12. The sections 62 and 66 can be attached together by means of fastener assemblies 70 inserted through bores 64 and 68. By adjusting the effective length of the fastener assemblies 70, rod and reel 72 can be held in the clamp member 60.

Support assembly 10 is used by inserting the base 14 into the ground in a position on the bank adjacent to a river, stream, lake or the like. The base 14 can be constructed from a rigid metallic material suitable for insertion into the ground. In fact, the body 30 can be removed from the base 14 and the base driven into the ground by striking the base on the upper end thereof. Once the base 14 is in place, the body 30 can be attached thereto by inserting the portion 32 into the socket 22 and, if desired, tightening the wing nut 26. The angle of the rod and reel 12 can be adjusted by appropriately engaging pawls 42 and teeth 54. The rod and reel 12 can then be left unattended.

Once a fish is hooked on the line and begins to pull on the rod and reel, the operation of the ratchet teeth 52 and pawls 42 come into play. If a sufficient force is applied to overcome the force preventing rotation of the member 60, the rod and reel 12 will be caused to rotate in the direction of arrow 74. This rotation of the rod and reel 12 in the direction of arrow 74 about a horizontal axis, tends to position the rod in a direction toward the fish. In addition, if the wing nut 26 is loosened, the rod can also rotate about a vertical axis. The rotation about a vertical axis will also allow the rod to rotate as the fish moves about in the water. This horizontal and vertical rotation of the rod reduces extreme bends in the line, which in turn reduce stress concentration and line failures.

The minimum force required to rotate the rod about the horizontal axis can be selected by selecting the resiliency of the arms 34 and 36 to cause the desired engagement of the pawls 42 with teeth 54. It is desired that the force required to rotate the rod be designed to be less than the line strength.

In addition, when a fisherman observes a fish hooked on the line of the rod and reel 12, he can grasp the rod in one hand, loosen the wing nut 26, if required, and lift the rod and reel 12 and body 30 from the base 14. The fisherman can then play or fight the fish with the rod and reel 12 freely maneuverable in his hands.

Figure 6:
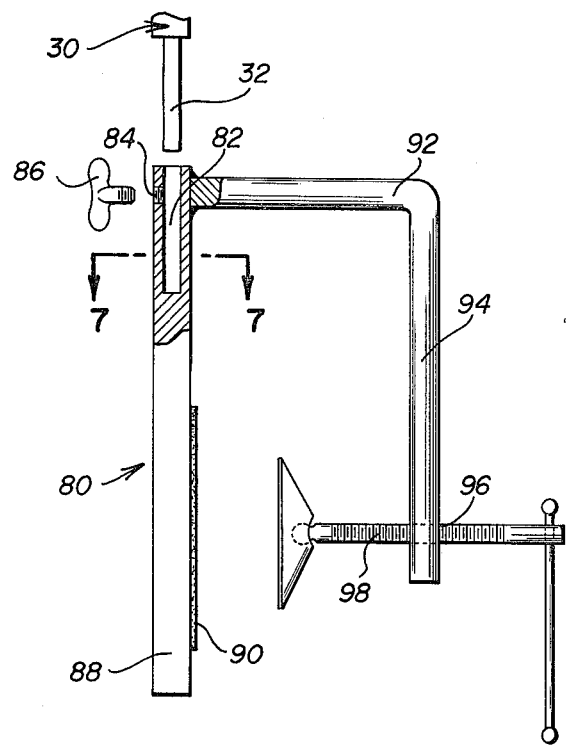
FIG. 6 illustrates a side elevation view of an alternate embodiment of a base of the present invention.
Figure 7:
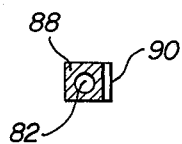
FIG. 7 illustrates a section of the device taken on line 7—7 of FIG. 6, looking in the direction of the arrows.
Figure 5:
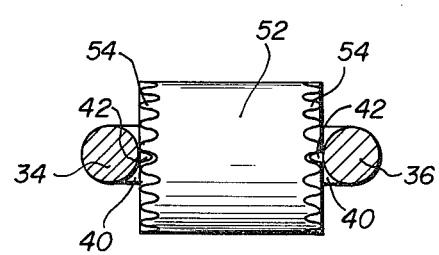
FIG. 5 illustrates a section of the device taken on line 5—5 of FIG. 2, looking in the direction of the arrows.

A second embodiment of the base 14 is illustrated in FIGS. 6 and 7. In this embodiment, a base 80 for use in attachment to a pier or the side of a boat or the like, is illustrated. This base 80 is provided with a bore 82 for receiving the portion 32 and a bore 84 and wing nut 86 for fixing the portion 32 within the bore 82 as previously described.

The base 80 is provided with a downwardly extending leg 88, covered with a resilient material 90 on one side thereof. The base 80 is provided with a leg 92 which extends transverse to the leg 88 and is provided with a downwardly extending portion 94 which extends parallel to the leg 88. A threaded bore 96 is formed in the portion 94 and a screw assembly 98 is mounted in the bore 96 for use in clamping the base 80 on the side of a pier, boat or the like.

It is also to be understood, of course, that the foregoing disclosure relates only to the preferred embodiments of the present invention and that numerous alterations can be utilized to practice the present invention without departing from the spirit and scope of the invention as defined in the appended claims.

I claim:
1. A fishing rod support comprising:
a rigid elongated body, a cylindrical-shaped portion formed on the lower end of said body, a pair of parallel-spaced arms on the upper end of said body, the ends of said arms being turned inward along a common axis, said ends of said arms having a cylindrical shape with the exterior of said arms forming bearing surfaces, said arms being resiliently held in parallel position, pawls formed on the inside surfaces of said arms;
a base having a cylindrical socket in the upper end thereof receiving said cylindrical portion of said body thereby allowing rotation between said body and base, means on the lower end of said base for anchoring the base in place with said socket extending in a vertically upward direction; and a clamp member having a cylindrical portion, sockets formed in either end of said cylindrical portion receiving said ends of said arms therein, means formed on said cylindrical portion for releasably attaching a fishing rod to said support, ratchet teeth formed on both ends of said cylindrical portion resiliently engaged by said pawls thereby allowing rotation of said clamp member about a horizontally extending axis upon the application of a force on said fishing rod in excess of a minimum.

2. The support of claim 1 wherein said base comprises an elongated anchor pointed at one end for embedding in the ground and wherein said pointed end has a hollow ground cross-section shape.

3. The support of claim 1 wherein said base comprises a clamp means for frictionally engaging a rigid structure.

4. A fishing rod support comprising: a rigid body, base means attached to said body for anchoring said body in place, clamp means attached to said body for releasably attaching a fishing rod to said body, pivot means for attaching said clamp means to said body for allowing rotation of said clamp means with respect to said body about a horizontally extending axis when said body is anchored in place, and resilient means engaging said base and clamp means for resiliently resisting rotation of said clamp means with respect to said body, said resilient means comprising irregular surfaces and pawls engaging said irregular surfaces.

5. The support of claim 4 wherein said irregular surfaces comprise ratchet teeth.

6. The support of claim 4 additionally comprising means allowing rotation of said clamp means with respect to said base about a vertically extending axis.

7. The support of claim 4 wherein said base comprises an elongated anchor pointed at one end and having a hollow ground cross section at said pointed end.

8. The support of claim 4 additionally comprises means for detaching said body from said base.

* * * * *